United States Patent
Weinerth et al.

(10) Patent No.: US 9,823,787 B2
(45) Date of Patent: Nov. 21, 2017

(54) ABSOLUTE CAPACITIVE SENSING USING SENSOR ELECTRODE PRE-EMPHASIS

(71) Applicant: Synaptics Incorporated, San Jose, CA (US)

(72) Inventors: John Weinerth, San Jose, CA (US); Adam Schwartz, Redwood City, CA (US)

(73) Assignee: Synaptics Incorporated, San Jose, CA (US)

( * ) Notice: Subject to any disclaimer, the term of this patent is extended or adjusted under 35 U.S.C. 154(b) by 41 days.

(21) Appl. No.: 14/205,132

(22) Filed: Mar. 11, 2014

(65) Prior Publication Data

US 2015/0261341 A1    Sep. 17, 2015

(51) Int. Cl.
G06F 3/044 (2006.01)
G06F 3/041 (2006.01)

(52) U.S. Cl.
CPC ............ G06F 3/044 (2013.01); G06F 3/0416 (2013.01)

(58) Field of Classification Search
CPC .................. G06F 3/044; G06F 3/0416; G06F 2203/04101; G06F 2203/04112
See application file for complete search history.

(56) References Cited

U.S. PATENT DOCUMENTS

| | | |
|---|---|---|
| 2009/0009498 A1 | 1/2009 | Nishimura |
| 2009/0128305 A1 | 5/2009 | Mortimer et al. |
| 2012/0161794 A1* | 6/2012 | Ningrat ................. G06F 3/0418 324/677 |
| 2012/0293190 A1 | 11/2012 | Shahparnia et al. |
| 2013/0141372 A1 | 6/2013 | Kang |
| 2013/0278538 A1* | 10/2013 | Brunet et al. ................. 345/174 |
| 2014/0021966 A1 | 1/2014 | Shahrokhi et al. |
| 2014/0049509 A1 | 2/2014 | Shepelev et al. |
| 2015/0145535 A1* | 5/2015 | Nys ....................... G06F 3/0418 324/679 |

FOREIGN PATENT DOCUMENTS

KR    1020130060070 A    6/2013

OTHER PUBLICATIONS

ISA/KR, International Search Report and Written Opinion for International Application # PCT/US2015/019673, pp. 1-9, dated May 29, 2015 (May 29, 2015).

* cited by examiner

*Primary Examiner* — Christopher E Leiby
(74) *Attorney, Agent, or Firm* — Osha Liang LLP

(57) ABSTRACT

A processing system comprises a sensor module and a determination module. The sensor module is configured to drive a modulated signal on to a sensor electrode to achieve a target voltage on the sensor electrode during a first portion of a sensing cycle, wherein the modulated signal comprises a first voltage that is beyond a level of the target voltage and which is driven for a first period of time and a second voltage that is at the target voltage and which is driven for a second period of time that follows the first period of time. The determination module is configured to determine an absolute capacitance of the sensor electrode during the first portion of the sensing cycle after driving the second voltage.

18 Claims, 8 Drawing Sheets

1000

DRIVING A MODULATED SIGNAL ONTO A SENSOR ELECTRODE TO ACHIEVE A TARGET VOLTAGE ON THE SENSOR ELECTRODE DURING A FIRST PORTION OF A SENSING CYCLE, WHEREIN THE MODULATED SIGNAL COMPRISES A FIRST VOLTAGE THAT IS BEYOND A LEVEL OF THE TARGET VOLTAGE AND WHICH IS DRIVEN FOR A FIRST PERIOD OF TIME AND A SECOND VOLTAGE THAT IS AT THE TARGET VOLTAGE AND WHICH IS DRIVEN FOR A SECOND PERIOD OF TIME THAT FOLLOWS THE FIRST PERIOD OF TIME
1010

DETERMINING AN ABSOLUTE CAPACITANCE OF THE SENSOR ELECTRODE DURING THE FIRST PORTION OF THE SENSING CYCLE AFTER DRIVING THE SECOND VOLTAGE
1020

ABSOLUTE CAPACITIVE SENSING USING SENSOR ELECTRODE PRE-EMPHASIS

BACKGROUND

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones and tablet computers). Such touch screen input devices are typically superimposed upon or otherwise collocated with a display of the electronic system.

SUMMARY

In a processing system embodiment, the processing system comprises a sensor module and a determination module. The sensor module is configured to drive a modulated signal on to a sensor electrode to achieve a target voltage on the sensor electrode during a first portion of a sensing cycle, wherein the modulated signal comprises a first voltage that is beyond a level of the target voltage and which is driven for a first period of time and a second voltage that is at the target voltage and which is driven for a second period of time that follows the first period of time. The determination module is configured to determine an absolute capacitance of the sensor electrode during the first portion of the sensing cycle after driving the second voltage.

BRIEF DESCRIPTION OF DRAWINGS

The drawings referred to in this Brief Description of Drawings should not be understood as being drawn to scale unless specifically noted. The accompanying drawings, which are incorporated in and form a part of the Description of Embodiments, illustrate various embodiments and, together with the Description of Embodiments, serve to explain principles discussed below, where like designations denote like elements.

FIGS. 10A, 10B, and 10C illustrate a flow diagram for a method of capacitive sensing, according to various embodiments.

DESCRIPTION OF EMBODIMENTS

Figure 1:
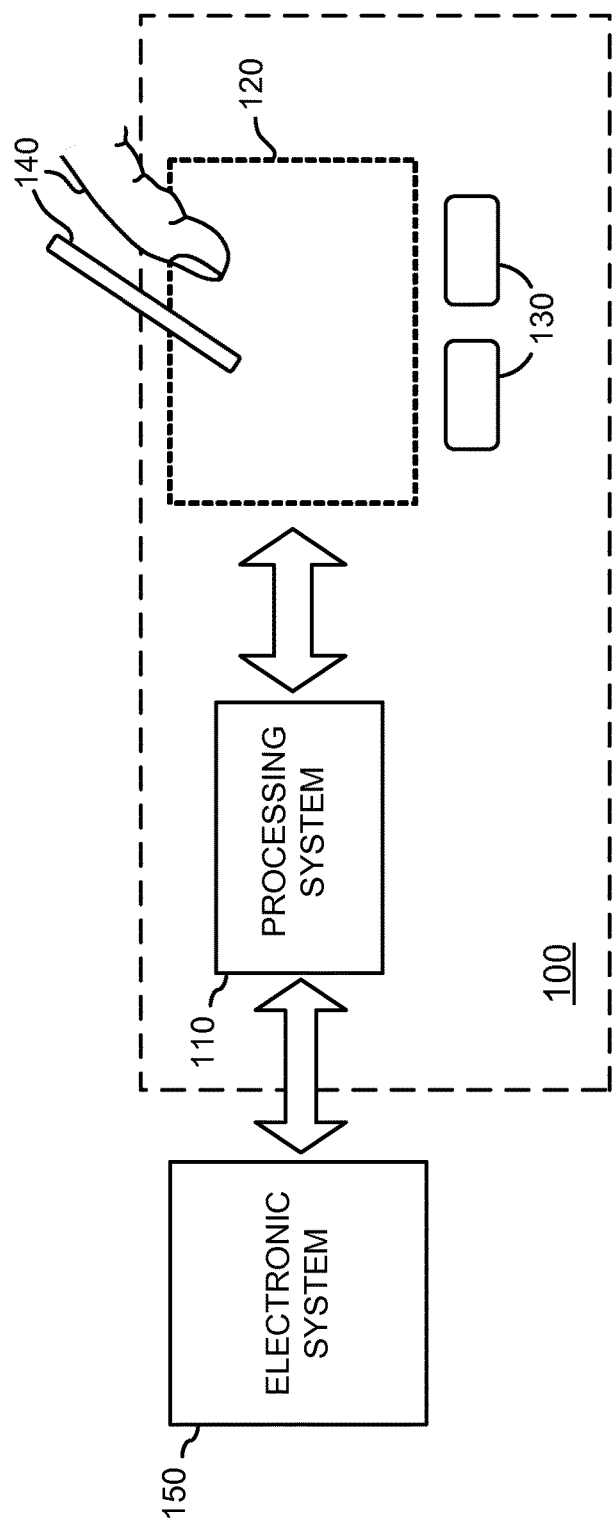
FIG. 1 is a block diagram of an example input device, in accordance with embodiments.

The following Description of Embodiments is merely provided by way of example and not of limitation. Furthermore, there is no intention to be bound by any expressed or implied theory presented in the preceding Background, Summary, or Brief Description of Drawings or the following Description of Embodiments.

Overview of Discussion

Herein, various embodiments are described that provide input devices, processing systems, and methods that facilitate improved usability. In various embodiments described herein, the input device may be a capacitive sensing input device. A sensor electrode used for absolute capacitive sensing has a sensor time constant which sets a limit on how quickly charge can be integrated off of the sensor electrode. This time constant is set by the parasitic resistance and capacitance or the sensor electrode. This time constant also sets a limit on how quickly a sensor electrode can charge to and settle at a target voltage when, conventionally, only that target voltage is driven on to the sensor electrode.

Embodiments associated with absolute capacitive sensing using sensor electrode pre-emphasis to overdrive a sensor electrode beyond a target voltage, for a period of time, are described. Utilizing pre-emphasis techniques described herein, efficiencies may be achieved by causing a sensor electrode to settle at a target voltage level more quickly than can be accomplished in a conventional manner where such pre-emphasis techniques are not utilized. An absolute capacitive sensing cycle which uses pre-emphasis techniques described herein can thus be sped up in comparison to a conventional absolute capacitive sensing cycle, due to faster settling of the sensor electrode to a target voltage. Among other things, this increase in the speed at which an absolute capacitive sensing cycle can be accomplished allows for increasing the overall sensing frequency used for conducting absolute capacitive sensing; and thus can facilitate absolute capacitance sensing at higher frequencies that avoid lower frequencies at which interference often occurs. Also, using the pre-emphasis techniques described herein, each half sensing cycle measures the absolute capacitance of the sensor. In this manner, a programmable number of full sensing cycles results in the averaged (filtered) measurement of the absolute capacitance. For a given period of time, running at a higher frequency (made possible by the pre-emphasis techniques described herein) will allow for more measurements of the absolute capacitance, which will result in a more accurate measurement of the absolute capacitance.

Discussion begins with a description of an example input device with which or upon which various embodiments described herein may be implemented. An example sensor electrode pattern is then described. This is followed by description of an example processing system and some components thereof. The processing system may be utilized with as a portion of an input device, such as a capacitive sensing input device. Several example input devices are described in conjunction with respective timing diagrams. Operation of the input devices, processing systems, and components thereof are then further described in conjunction with description of an example method of capacitive sensing.

Example Input Device

Turning now to the figures, FIG. 1 is a block diagram of an exemplary input device 100, in accordance with various embodiments. Input device 100 may be configured to provide input to an electronic system/device 150. As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic systems could be a host or a slave to the input device.

Input device 100 can be implemented as a physical part of an electronic system 150, or can be physically separate from electronic system 150. As appropriate, input device 100 may communicate with parts of the electronic system using any one or more of the following: buses, networks, and other wired or wireless interconnections. Examples include, but are not limited to: Inter-Integrated Circuit (I2C), Serial Peripheral Interface (SPI), Personal System 2 (PS/2), Universal Serial Bus (USB), Bluetooth®, Radio Frequency (RF), and Infrared Data Association (IrDA).

In FIG. 1, input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, around, in and/or near input device 100, in which input device 100 is able to detect user input (e.g., user input provided by one or more input objects 140). The sizes, shapes, and locations of particular sensing regions may vary widely from embodiment to embodiment. In some embodiments, sensing region 120 extends from a surface of input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of input device 100, contact with an input surface (e.g., a touch surface) of input device 100, contact with an input surface of input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, sensing region 120 has a rectangular shape when projected on to an input surface of input device 100.

Input device 100 may utilize any combination of sensor components and sensing technologies to detect user input in sensing region 120. Input device 100 comprises one or more sensing elements for detecting user input. As a non-limiting example, input device 100 may use capacitive techniques.

Some implementations are configured to provide images that span one, two, three, or higher dimensional spaces. Some implementations are configured to provide projections of input along particular axes or planes.

In some capacitive implementations of input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g., system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more sensor electrodes which transmit transmitter signal(s) (also "transmitter electrodes" or "transmitters") and one or more sensor electrodes (also "receiver electrodes" or "receivers") that receive resulting signals that result from the transmitter signal(s). Collectively transmitters and receivers may be referred to as sensor electrodes or sensor elements. The transmitting sensor electrodes may be driving such that they are modulated relative to a reference voltage (e.g., system ground) to transmit transmitter signals. Sensor electrodes that receive resulting signals may be held substantially constant relative to the reference voltage to facilitate receipt of resulting signals. A resulting signal may comprise effect(s) corresponding to one or more transmitter signals, and/or to one or more sources of environmental interference (e.g., other electromagnetic signals). Sensor electrodes may be dedicated transmitters or receivers, or may be configured to both transmit and receive. In some embodiments, one or more sensor electrodes may be operated to receive a resulting signal when no sensor electrodes are transmitting (e.g., the transmitters are disabled). In this manner, the resulting signal represents noise detected in the operating environment of sensing region 120.

In FIG. 1, a processing system 110 is shown as part of input device 100. Processing system 110 is configured to operate the hardware of input device 100 to detect input in sensing region 120. Processing system 110 comprises parts of or all of one or more integrated circuits (ICs) and/or other circuitry components. (For example, a processing system for a mutual capacitance sensor device may comprise transmitter circuitry configured to transmit signals with sensor electrodes, and/or receiver circuitry configured to receive signals with sensor electrodes). In some embodiments, processing system 110 also comprises electronically-readable instructions, such as firmware code, software code, and/or the like. In some embodiments, components composing processing system 110 are located together, such as near sensing element(s) of input device 100. In other embodiments, components of processing system 110 are physically separate with one or more components close to sensing element(s) of input device 100, and one or more components elsewhere. For example, input device 100 may be a peripheral coupled to a desktop computer, and processing system 110 may comprise software configured to run on a central processing unit of the desktop computer and one or more ICs (perhaps with associated firmware) separate from the central processing unit. As another example, input device 100 may be physically integrated in a phone, and processing system 110 may comprise circuits and firmware that are part of a main processor of the phone. In some embodiments, processing system 110 is dedicated to implementing input device 100. In other embodiments, processing system 110 also performs other functions, such as operating display screens, driving haptic actuators, etc.

Processing system 110 may be implemented as a set of modules that handle different functions of processing system 110. Each module may comprise circuitry that is a part of processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, determination modules configured to determine absolute capacitance and positions of any inputs objects therefrom, determination modules configured to determine changes in transcapacitance and positions of any input objects therefrom, identification modules configured to identify gestures such as mode changing gestures, and mode changing modules for changing operation modes.

In some embodiments, processing system 110 responds to user input (or lack of user input) in sensing region 120 directly by causing one or more actions. Example actions include changing operation modes, as well as GUI actions such as cursor movement, selection, menu navigation, and other functions. In some embodiments, processing system 110 provides information about the input (or lack of input) to some part of the electronic system (e.g., to a central processing system of the electronic system that is separate from processing system 110, if such a separate central processing system exists). In some embodiments, some part of the electronic system processes information received from processing system 110 to act on user input, such as to facilitate a full range of actions, including mode changing actions and GUI actions.

For example, in some embodiments, processing system 110 operates the sensing element(s) of input device 100 to produce electrical signals indicative of input (or lack of input) in sensing region 120. Processing system 110 may perform any appropriate amount of processing on the electrical signals in producing the information provided to the electronic system. For example, processing system 110 may digitize analog electrical signals obtained from the sensor electrodes. As another example, processing system 110 may perform filtering or other signal conditioning. As yet another example, processing system 110 may subtract or otherwise account for a baseline, such that the information reflects a difference between the electrical signals and the baseline. As yet further examples, processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, input device 100 is implemented with additional input components that are operated by processing system 110 or by some other processing system. These additional input components may provide redundant functionality for input in sensing region 120, or some other functionality. FIG. 1 shows buttons 130 near sensing region 120 that can be used to facilitate selection of items using input device 100. Other types of additional input components include sliders, balls, wheels, switches, and the like. Conversely, in some embodiments, input device 100 may be implemented with no other input components.

In some embodiments, input device 100 may be a touch screen, and sensing region 120 overlaps at least part of an active area of a display screen. For example, input device 100 may comprise substantially transparent sensor electrodes overlaying the display screen and provide a touch screen interface for the associated electronic system 150. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. Input device 100 and the display screen may share physical elements. For example, some embodiments may utilize some of the same electrical components for displaying and sensing. As another example, the display screen may be operated in part or in total by processing system 110.

It should be understood that while many embodiments are described in the context of a fully functioning apparatus, the mechanisms are capable of being distributed as a program product (e.g., software) in a variety of forms. For example, the mechanisms that are described may be implemented and distributed as a software program on information bearing media that are readable by electronic processors (e.g., non-transitory computer-readable and/or recordable/writable information bearing media readable by processing system 110). Additionally, the embodiments apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other tangible storage technology.

Sensor Electrode Pattern

Figure 2:
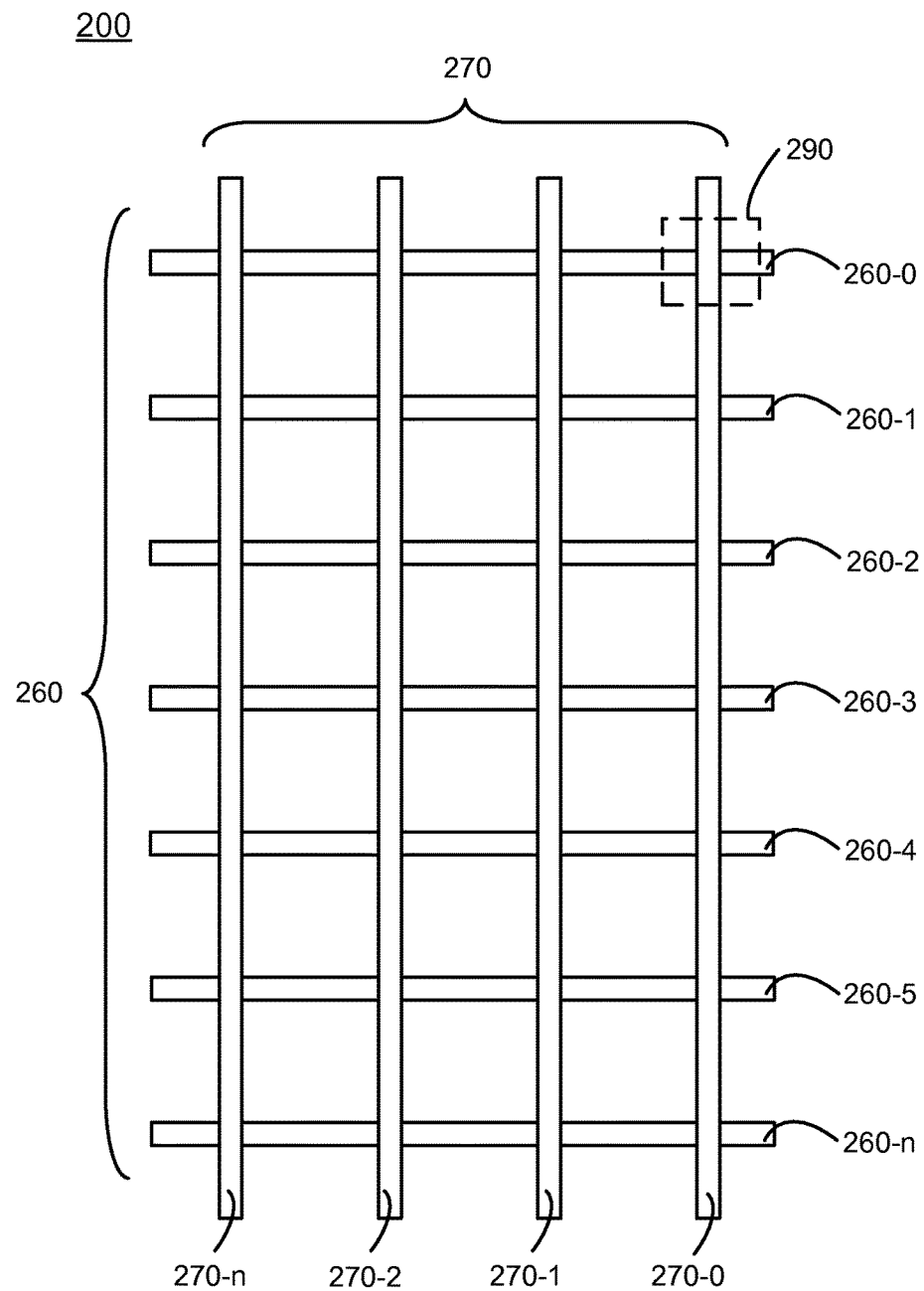
FIG. 2 shows a portion of an example sensor electrode pattern which may be utilized in a sensor to generate all or part of the sensing region of an input device, such as a touch screen, according to some embodiments.

FIG. 2 shows a portion of an example sensor electrode pattern 200 which may be utilized in a sensor to generate all or part of the sensing region of input device 100, according to various embodiments. Input device 100 is configured as a capacitive sensing input device when utilized with a capacitive sensor electrode pattern. For purposes of clarity of illustration and description, a non-limiting simple rectangular sensor electrode pattern 200 is illustrated which may be used for absolute capacitive sensing, transcapacitive sensing, or both. It is appreciated that numerous other sensor electrode patterns may be employed with the techniques described herein, including but not limited to: patterns with a single sensor electrode, patters with sensor electrodes that are shapes other than rectangles, patterns with a single set of sensor electrodes, patterns with two sets of sensor electrodes disposed in a single layer (without overlapping), patterns that utilize a common voltage electrode ($V_{COM}$) and/or other display electrodes of a display device to perform some aspects of capacitive sensing, and patterns that provide individual button electrodes. The illustrated sensor electrode pattern is made up of a first plurality of sensor electrodes 270 (270-0, 270-1, 270-2 . . . 270-$n$) and a second plurality of electrodes 260 (260-0, 260-1, 260-2 . . . 260-$n$) which overlay one another, in this example. In the illustrated example, touch sensing pixels are centered at locations where sensor electrodes used for transmitting and sensor electrode used for receiving cross. Capacitive pixel 290 illustrates one of the capacitive pixels generated by sensor electrode pattern 200 during transcapacitive sensing. It is appreciated that in a crossing sensor electrode pattern, such as the illustrated example, some form of insulating material or substrate is typically disposed between sensor electrodes 260 and sensor electrodes 270. However, in some embodiments, the second plurality of electrodes 260 and first plurality of electrodes 270 may be disposed on the same layer as one another through use of routing techniques and/or jumpers. In various embodiments, touch sensing includes sensing input objects anywhere in sensing region 120 and may comprise: no contact with any surfaces of the input device 100, contact with an input surface (e.g., a touch surface) of the input device 100, contact with an input surface of the input device 100 coupled with some amount of applied force or pressure, and/or a combination thereof.

When accomplishing transcapacitive measurements, capacitive pixels, such as capacitive pixel 290, are areas of localized capacitive coupling between a sensor electrode of sensor electrodes 260 and a sensor electrode of sensor of sensor electrodes 270. For example, the capacitive coupling between sensor electrodes 260 that are driven with a transmitter signal and sensor electrodes 270 that receive a resulting signal changes with the proximity and motion of input objects in the sensing region associated with sensor electrodes 260 and sensor electrodes 270.

In some embodiments, sensor electrode pattern 200 is "scanned" to determine these capacitive couplings. That is, the sensor electrodes 260 are driven to transmit transmitter signals. Transmitters may be operated such that one of sensor electrodes 260 transmits at one time, or multiple of sensor electrodes 260 transmit at the same time. Where multiple of sensor electrodes 260 transmit simultaneously, these multiple sensor electrodes may transmit the same transmitter signal and produce an effectively larger "transmitter electrode," or these multiple sensor electrodes may transmit different transmitter signals. For example, multiple sensor electrodes 260 may transmit different transmitter signals according to one or more coding schemes that enable their combined effects on the resulting signals received with sensor electrodes 270 to be independently determined.

In an embodiment wherein sensor electrodes 260 are used to transmit signals for transcapacitive sensing, sensor electrodes 270 may be operated singly or multiply to acquire resulting signals. The resulting signals may be used to determine measurements of the capacitive couplings at the capacitive pixels.

A set of measurements from the capacitive pixels form a "capacitive image" (also "capacitive frame") representative of the capacitive couplings at the pixels. Multiple capacitive images may be acquired over multiple time periods, and differences between them used to derive information about input in the sensing region. For example, successive capacitive images acquired over successive periods of time can be used to track the motion(s) of one or more input objects entering, exiting, and within the sensing region.

In some embodiments, one or more sensor electrodes 260 or 270 may be operated to perform absolute capacitive sensing at a particular instance of time. For example, sensor electrode 270-0 may be charged and then the capacitance associated with sensor electrode 270-0 may be measured. In such an embodiment, an input object 140 interacting with sensor electrode 270-0 alters the electric field near sensor electrode 270-0, thus changing the measured capacitive coupling. In this same manner, a plurality of sensor electrodes 270 may be used to measure absolute capacitance and/or a plurality of sensor electrodes 260 may be used to measure absolute capacitance. It should be appreciated that when performing absolute capacitance measurements the labels of "receiver electrode" and "transmitter electrode" lose the significance that they have in transcapacitive measurement techniques, and instead a sensor electrode 260 or 270 may simply be referred to as a "sensor electrode" or may even be referred to as a "receiver electrode" since any sensor electrode used for absolute capacitive sensing is used for receiving.

By performing absolute capacitive sensing with a plurality or all of the sensor electrodes aligned along a common axis, the absolute capacitances that are measured may be used to produce a capacitive profile with respect to those sensor electrodes. With reference to FIG. 2, for example, a first absolute capacitive profile can be produced from absolute capacitance measurements made with sensor electrodes 260. With continued reference to FIG. 2, a second absolute capacitive profile that is substantially orthogonal to the first absolute capacitive profile can be produced from absolute capacitance measurements obtained from sensor electrodes 270. Such "X and Y axis" absolute capacitive profiles can be utilized to determine the location of one or more input objects with respect to a sensing region associates with sensor electrode pattern 200.

Example Processing System

Figure 3:
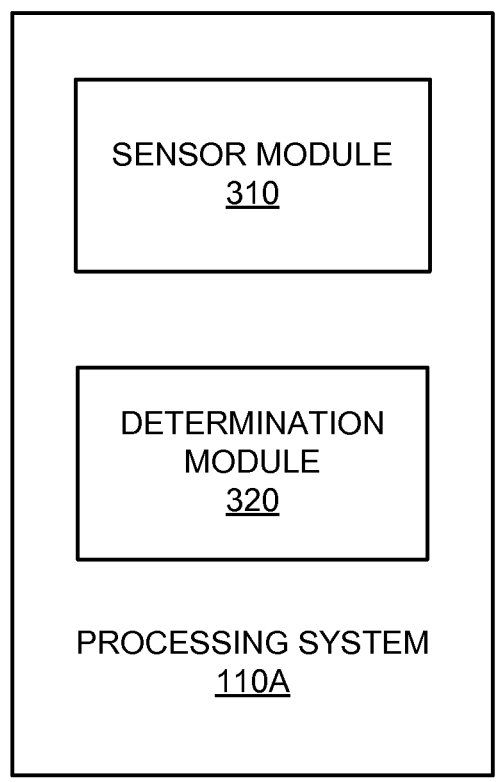
FIG. 3 shows a block diagram of an example processing system, according to an embodiment.

FIG. 3 illustrates a block diagram of some components of an example processing system 110A that may be utilized with an input device (e.g., in place of processing system 110 as part of input device 100), according to various embodiments. Processing system 110A may be implemented with one or more Application Specific Integrated Circuits (ASICSs), one or more Integrated Circuits (ICs), one or more controllers, or some combination thereof. In one embodiment, processing system 110A is communicatively coupled with one or more sensor electrodes of a first and second plurality (e.g., sensor electrodes 260 and 270) that implement a sensing region 120 of an input device 100. In some embodiments, processing system 110A and the input device 100 of which it is a part may be disposed in or communicatively coupled with an electronic system 150, such as a display device, computer, or other electronic system.

In one embodiment, processing system 110A includes, among other components: sensor module 310, and determination module 320. Processing system 110A and/or components thereof may be coupled with sensor electrodes of a sensor electrode pattern, such as sensor electrode pattern 200, among others. For example, sensor module 310 is coupled with one or more sensor electrodes (260, 270) of a sensor electrode pattern (e.g., sensor electrode pattern 200) of input device 100.

Sensor module 310 comprises sensor circuitry and operates to interact with the sensor electrodes, of a sensor electrode pattern, that are utilized to generate a sensing region 120. This includes operating a first plurality of sensor electrodes (e.g., sensor electrodes 260) to be silent, to be driven with a transmitter signal, to be used for transcapacitive sensing, and/or to be used for absolute capacitive sensing. This also includes operating a second plurality of sensor electrodes (e.g., sensor electrodes 270) to be silent, to be driven with a transmitter signal, to be used for transcapacitive sensing, and/or to be used for absolute capacitive sensing.

During transcapacitive sensing, sensor module 310 operates to drive transmitter signals on one or more sensor electrodes of a first plurality of sensor electrodes (e.g., one or more of sensor electrodes 260). A transmitter signal may be a square wave, trapezoidal wave, or some other waveform. In a given time interval, sensor module 310 may drive or not drive a transmitter signal (waveform) on one or more of the plurality of sensor electrodes. Sensor module 310 may also be utilized to couple one or more of the first plurality of sensor electrodes to high impedance, ground, or to a constant voltage when not driving a transmitter signal on such sensor electrodes. In some embodiments, when performing transcapacitive sensing, sensor module 310 drives two or more sensor electrodes of a sensor electrode pattern at one time. When driving two or more sensor electrodes of a sensor electrode pattern at once, the transmitter signal may be coded according to a code. Sensor module 310 also operates to receive resulting signals, via a second plurality of sensor electrodes (e.g., one or more of sensor electrodes 270) during transcapacitive sensing. During transcapacitive sensing, received resulting signals correspond to and include effects corresponding to the transmitter signal(s) transmitted via the first plurality of sensor electrodes. These transmitted transmitter signals may be altered or changed in the resulting signal due to presence of an input object, stray capacitance, noise, interference, and/or circuit imperfections among other factors, and thus may differ slightly or greatly from their transmitted versions.

In absolute capacitive sensing, a sensor electrode is both driven and used to receive a resulting signal that results from the signal driven on to the sensor electrode. In this manner, during absolute capacitive sensing, sensor module 310 operates to drive a signal on to and receive a signal from one or more of sensor electrodes 260 or 270. During absolute capacitive sensing, the driven signal may be referred to as an absolute capacitive sensing signal, transmitter signal, or modulated signal, and it is driven through a routing trace that provides a communicative coupling between processing system 110A and the sensor electrode(s) with which absolute capacitive sensing is being conducted.

During absolute capacitive sensing sensor module 310 operates to drive a modulated signal on to a sensor electrode (e.g., 270-0) to achieve a target voltage on the sensor electrode during a first portion of a sensing cycle. The first portion may be the first half or first 180 degrees of a 360 degree sensing cycle. The target voltage is a voltage at which the sensor electrode settles before charge is integrated off of the sensor electrode during the first portion of the sensing cycle. During the first portion of the sensing cycle, the modulated signal comprises at least a first voltage and a second voltage. The first voltage is beyond a level of the target voltage and is driven for a first period time, while the second voltage that is at the target voltage and is driven for a second period of time that follows the first period of time. By way of example and not of limitation, in one embodiment, the target voltage at which the sensor electrode is to settle is, for example purposes, +1.5 v during the first portion of a sensing cycle. In such an example, sensor module 310 overdrives the sensor electrode with modulated signal at a first voltage, such as at +2.5 v, for a first period of time before stepping down the voltage of the modulated signal to a second voltage that is at the target voltage (+1.5 v in this example) for a second period of time. Either or both of the first and second periods of time may be fixed in length or may have their length(s) adjusted by sensor module 310. By overdriving the sensor electrode with the first voltage the sensor electrode, the target voltage is "pre-emphasized" and the sensor electrode reaches, and can thus settle at, the target voltage more quickly than if the modulated signal only drove the sensor electrode with the second voltage which is at the target voltage.

Figure 4:
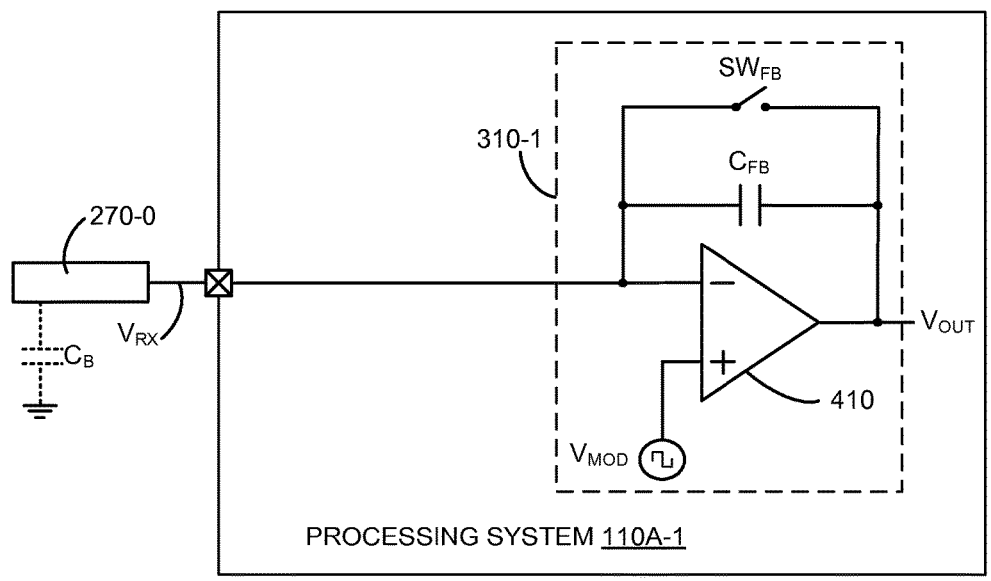
FIG. 4 illustrates an example input device, according to an embodiment.
Figure 5:
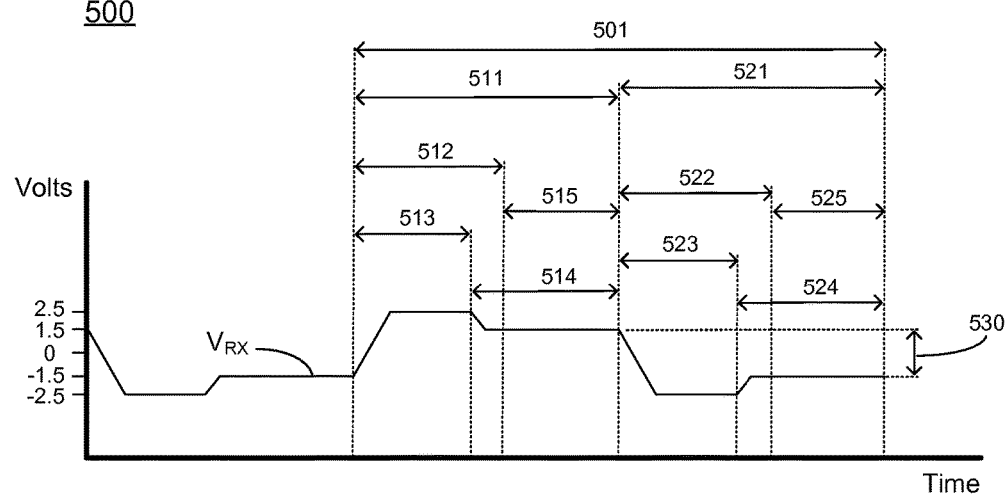
FIG. 5 illustrates a timing diagram for absolute capacitive sensing with the input device of FIG. 4, according to an embodiment.

As is depicted and described in greater detail in conjunction with FIG. 4 and FIG. 5, in some embodiments, sensor module 310 may operate to drive the modulated signal on to the sensor electrode by driving the modulated signal on to a first reference input of a receiver that has a second reference input coupled with the sensor electrode. The receiver may have one or more electrical circuit elements. For example, in some embodiments the receiver may include an amplifier and/or other different electrical circuit elements, any or all of which may be implemented as a portion of an integrated circuit. The feedback configuration of the receiver causes the voltage at the second reference input to follow the voltage applied to the first reference input of the receiver. In this manner, the first voltage and second voltage of the modulated signal can be driven on to the sensor electrode from the second reference input of the receiver.

Figure 6:
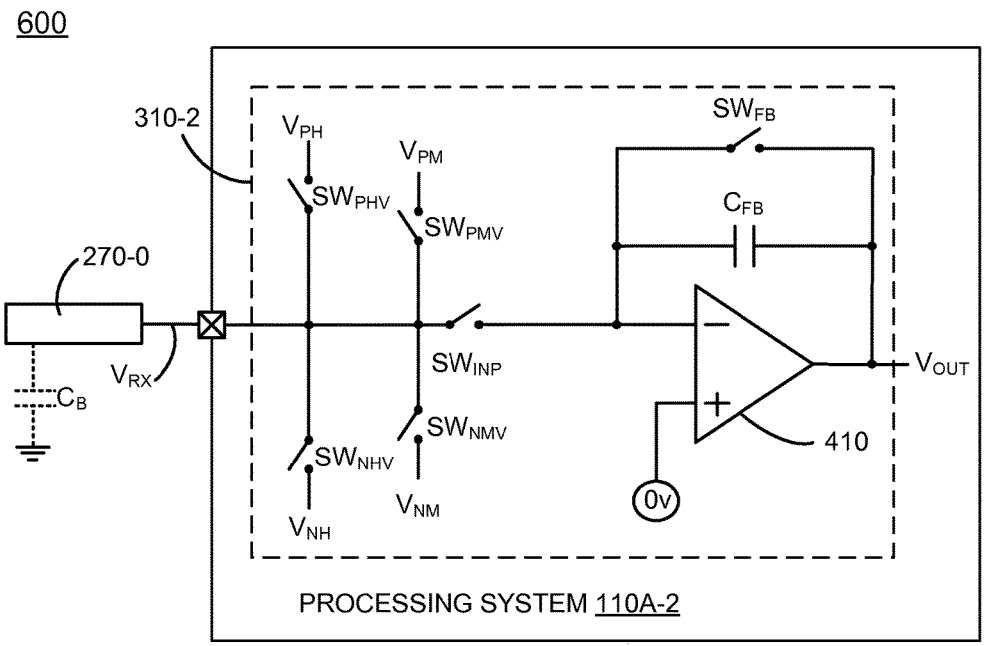
FIG. 6 illustrates an example input device, according to an embodiment.
Figure 7:
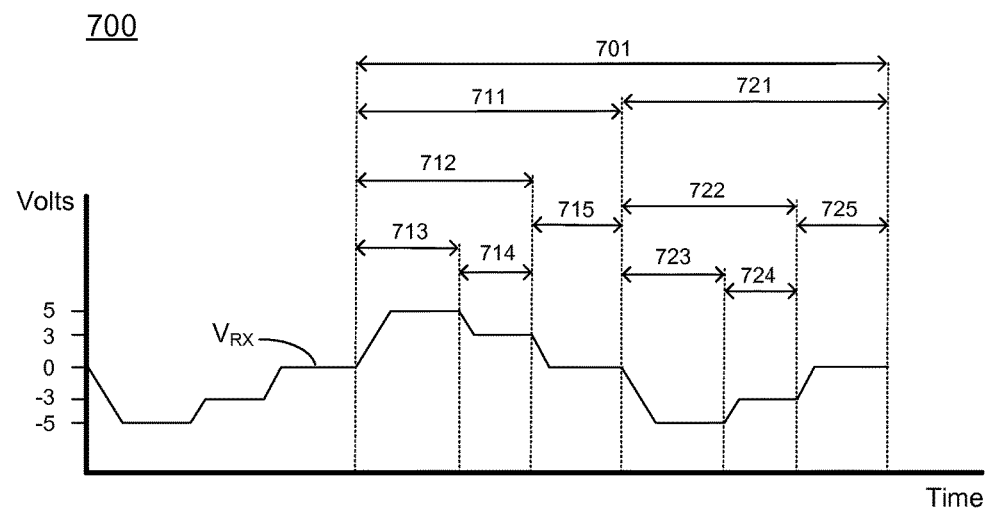
FIG. 7 illustrates a timing diagram for absolute capacitive sensing with the input device of FIG. 6, according to an embodiment.

As is depicted and described in greater detail in conjunction with FIG. 6 and FIG. 7, in some embodiments, sensor module 310 may operate to couple the first voltage with the sensor electrode through a switch during the first period of time and to couple the second voltage with the sensor electrode through a different switch during the second period of time.

Figure 8:
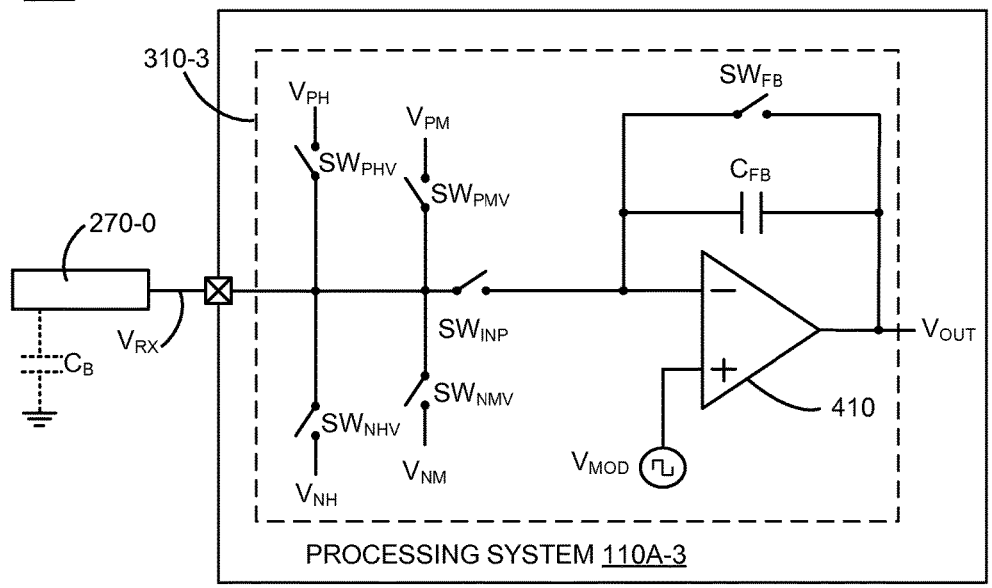
FIG. 8 illustrates an example input device, according to an embodiment.
Figure 9:
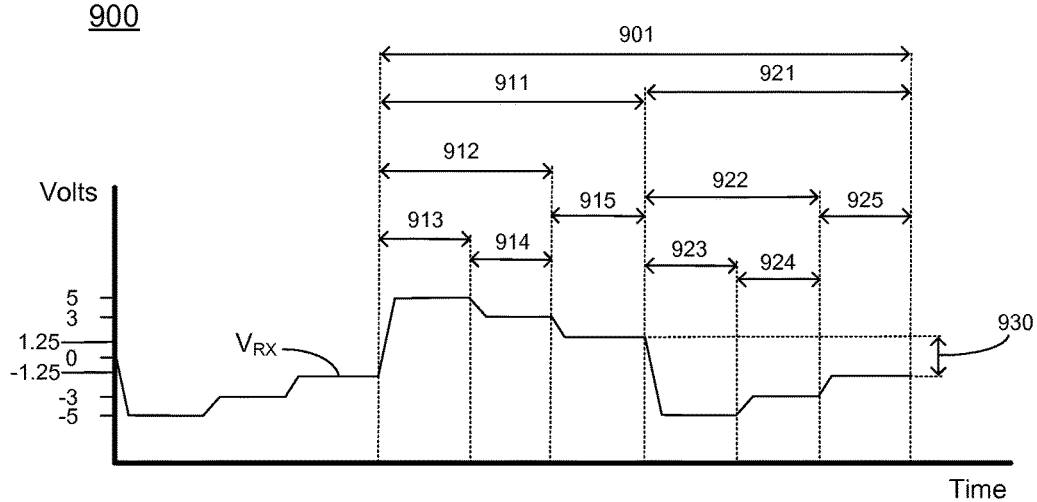
FIG. 9 illustrates a timing diagram for absolute capacitive sensing with the input device of FIG. 8, according to an embodiment.

As is depicted and described in greater detail in conjunction with FIG. 8 and FIG. 9, in some embodiments, sensor module 310 may operate to couple the first voltage with the sensor electrode through a switch during the first period of time and to couple the second voltage with the sensor electrode through a different switch during the second period of time and may further operate to drive a first reference input of a receiver with a voltage to effect a charge offset on a second reference input of the receiver while receiving resulting signals with the second reference input of the receiver.

While an amplifier is depicted in FIG. 4, FIG. 6, and FIG. 8, as being a receiver, it should be appreciated that other and/or additional electrical circuit elements may be used in various embodiments of a sensor module 310 to implement a receiver.

In some embodiments, sensor module 310 operates to drive the modulated signal on to the sensor electrode to achieve a second target voltage on the sensor electrode (e.g., sensor electrode 270-0) during a second portion of the sensing cycle. The second portion of the sensing cycle follows the first portion of the sensing cycle and may be the second half or second 180 degrees of a 360 degree sensing cycle. The second target voltage is a voltage at which the sensor electrode settles before charge is integrated off of the sensor electrode during the second portion of the sensing cycle. During the second portion of the sensing cycle, the modulated signal comprises at least a third voltage and a fourth voltage. The third voltage is beyond a level of the second target voltage and is driven for a third period of time, while the fourth voltage that is at the second target voltage and is driven for a fourth period of time that follows the third period of time. By way of example and not of limitation, in one embodiment, the second target voltage at which the sensor electrode is to settle is, for example purposes, −1.5 v during the first portion of a sensing cycle. In such an example, sensor module 310 overdrives the sensor electrode with modulated signal at a third voltage, such as at −2.5 v, for a third period of time before stepping the voltage of the modulated signal to a fourth voltage that is at the second target voltage (−1.5 v in this example) for a fourth period of time. Either or both of the third and fourth periods of time may be fixed in length or may have their length(s) adjusted by sensor module 310. By overdriving the sensor electrode with the third voltage the second target voltage is "pre-emphasized" and the sensor electrode reaches, and can thus settle at, the second target voltage more quickly than if the modulated signal only drove the sensor electrode with the fourth voltage which is at the second target voltage.

As is depicted and described in greater detail in conjunction with FIG. 4 and FIG. 5, in some embodiments, sensor module 310 may operate to drive the modulated signal on to the sensor electrode by driving the modulated signal on to a first reference input of a receiver (amplifier) that has a second reference input coupled with the sensor electrode. The feedback configuration of the receiver causes the voltage at the second reference input to follow the voltage applied to the first reference input of the receiver. In this manner, the third voltage and fourth voltage of the modulated signal can be driven on to the sensor electrode from the second reference input of the receiver.

As is depicted and described in greater detail in conjunction with FIG. 6 and FIG. 7, in some embodiments, sensor module 310 may operate to couple the third voltage with the sensor electrode through a switch during the third period of time and to couple the fourth voltage with the sensor electrode through a different switch during the fourth period of time.

As is depicted and described in greater detail in conjunction with FIG. 8 and FIG. 9, in some embodiments, sensor module 310 may operate to couple the third voltage with the sensor electrode through a switch during the third period of time and to couple the fourth voltage with the sensor electrode through a different switch during the fourth period of time and may further operate to drive a first reference input of a receiver with a voltage to effect a charge offset on a second reference input of the receiver while receiving resulting signals with the second reference input of the receiver.

For purposes of example only, the first portion of a sensing cycle is often described and depicted herein as the positive half of an absolute capacitive sensing cycle, while the second portion of the sensing cycle is then depicted and described as a negative half of the same absolute capacitive sensing cycle. It should be appreciated, however, that the order may of the cycles be reversed with the first half being negative and the second half being positive. Further, one of skill in the art should easily realize that, in some embodiments, all voltages in a modulated signal used in both the first and second portions of a single sensing cycle may be between zero volts and some positive voltage or may be between zero volts and some negative voltage.

Sensor module 310 includes one or more electrical circuit elements. For example, in some embodiments, one or more of the electrical circuit elements disposed in sensor module 310 is an amplifier. Such an amplifier may be interchangeably referred to as an "amplifier," a "front-end amplifier," a "receiver," an "integrating amplifier," a "differential amplifier," or the like, and operates to receive a resulting signal at an input and provide an integrated voltage as an output. The resulting signal is from one or more sensor electrodes of a sensor electrode pattern, such as sensor electrode pattern 200. A single amplifier may be coupled with and used to receive a resulting signal from exclusively from a single sensor electrode, may receive signals from multiple sensor electrodes that are simultaneously coupled with the amplifier, or may receive signals from a plurality of sensor electrodes that are coupled one at a time to the amplifier. A sensor module 310 may include multiple amplifiers utilized in any of these manners. For example, in some embodiments, a first amplifier may be coupled with a first sensor electrode while a second amplifier is coupled with a second sensor electrode.

Determination module 320 may be implemented as hardware (e.g., hardware logic and/or other circuitry) and/or as a combination of hardware and instructions stored in a non-transitory manner in a computer readable storage medium.

In embodiments where transcapacitive sensing is performed, determination module 320 operates to compute/determine a measurement of a change in a transcapacitive capacitive coupling between a first and second sensor electrode during transcapacitive sensing. Determination module 320 then uses such measurements to determine the positional information comprising the position of an input object (if any) with respect to sensing region 120. The positional information can be determined from a capacitive image. The capacitive is determined by determination module 320 based upon resulting signals acquired by sensor module 310. It is appreciated that determination module 320 operates to decode and reassemble coded resulting signals to construct a capacitive image from a transcapacitive scan of a plurality of sensor electrodes.

In embodiments where absolute capacitive sensing is performed with sensor electrodes 260 and/or 270, determination module 320 also operates to compute/determine a measurement of absolute capacitive coupling (also referred to as background capacitance, $C_B$) to a sensor electrode.

With respect to the techniques described herein, determination module 320 operates to determine an absolute capacitance of the sensor electrode (e.g., sensor electrode 270-0) during the first portion of the absolute capacitive sensing cycle after the second voltage has been driven on to the sensor electrode. Likewise, determination module 320 operates to determine an absolute capacitance of the sensor electrode (e.g., sensor electrode 270-0) during the second portion of the absolute capacitive sensing cycle after the fourth voltage has been driven on to the sensor electrode. Determination module 320 may use these measurements to determine whether or not an input object is present in a sensing region. Determination module 320 may also use these measurements to determine the position of an input object with respect to a sensing region. A variety of techniques for determining position of an input object, based on such measurements, are known in the art.

In some embodiments, processing system 110A comprises decision making logic which directs one or more portions of processing system 110A, such as sensor module 310 and/or determination module 320, to operate in a selected one of a plurality of different operating modes based on various inputs.

Example Input Devices

FIG. 4 illustrates an example input device 400, according to an embodiment. Input device 400 includes a processing system 110A-1 that is electrically coupled, such has by routing trace(s), with one or more sensor electrodes (sensor electrode 270-0 depicted) of a sensor electrode pattern (e.g., sensor electrode pattern 200) that forms a sensing region 120. Processing system 110A-1 includes sensor module 310-1 and is one embodiment of processing system 110A that is depicted in FIG. 3. Sensor module 310-1 is one embodiment of sensor module 310 of FIG. 3. As depicted, sensor module 310-1 includes a receiver in the form of amplifier 410. In operation, a modulated voltage, $V_{MOD}$, is applied at the non-inverting input of amplifier 410. A feedback capacitor, $C_{FB}$, is coupled between the output and the inverting input of amplifier 410. A switch, $SW_{FB}$, is coupled in parallel with $C_{FB}$. The inverting input of amplifier 410 is coupled with a sensor electrode, such as sensor electrode 270-0. The feedback from the output of amplifier 410 allows the voltage potential at the inverting input of amplifier 410 to be set by and follow the modulation of $V_{MOD}$ which is applied to the non-inverting input of amplifier 410. In this manner, the voltage present on the inverting input of amplifier 410 is driven on to sensor electrode 270-0 as $V_{RX}$, and adjusts with changes in $V_{MOD}$. $SW_{FB}$ is closed to reset $C_{FB}$ and is opened when amplifier 410 is used to integrate charge off of sensor electrode 270-0.

FIG. 5 illustrates a timing diagram 500 for absolute capacitive sensing with the input device 400 of FIG. 4, according to an embodiment. Timing diagram 500 illustrates a modulated signal in the form of receiver voltage, $V_{RX}$, that is driven on a sensor electrode, such as sensor electrode 270-0, over time during an example absolute capacitive sensing cycle 501 that utilizes pre-emphasis to speed settling time of sensor electrode 270-0 to target voltages in each of two portions (511 and 521) of sensing cycle 501.

For purposes of example, and not of limitation, in the illustrated embodiment of timing diagram 500, a first target voltage of +1.5 volts is the potential at which sensor electrode 270-0 is to settle at before integration during the first portion 511 of sensing cycle 501. It is well-known that an RC time constant establishes a length of time that it takes for a capacitor to charge to an applied voltage. However, instead of simply applying the target voltage and then waiting the appropriate number of time constants for sensor electrode 270-0 to charge to and then settle at that target voltage, the illustrated embodiment applies a boosted voltage that is beyond the target voltage. For example, during time period 513, $V_{RX}$ is boosted by sensor module 310-1 to a first voltage of +2.5 v (in this example), which is beyond the first target voltage of +1.5 v. This causes sensor electrode 270-0 to charge toward this boosted voltage, $V_{PH}$, for the duration of time period 513, and thus pre-emphasizes the first target voltage on the sensor electrode before $V_{PM}$ is coupled with the sensor electrode. It should be appreciated that the length of time period 513 may be adjusted to be shorter or longer by sensor module 310-1. The charged voltage on sensor electrode 270-0 is very near (slightly above or below) the first target voltage at the end of time period 513. Time period 514 runs from the end of time period 513 and until the end of first portion 511. It should be appreciated that the length of time period 514 may be adjusted to be shorter or longer by sensor module 310-1. During time period 514, $V_{RX}$ is modulated to a second voltage that is at the first target voltage so that the charged voltage on sensor electrode 270-0 can settle at the first target voltage and integration of charge on sensor electrode 270-0 can take place. Time period 512 represents the length of time that it takes for sensor electrode 270-0 to settle in to the first target voltage. During all or a portion of time period 515, the charge on sensor electrode 270-0 is received by the receiver (e.g., at the non-inverting input of amplifier 410) and is integrated to produce voltage $V_{OUT}$ at the output of amplifier 410. This $V_{OUT}$ is used by determination module 320 to determine an absolute capacitance, $C_B$, of sensor electrode 270-0 during the first portion 511 of sensing cycle 501.

For purposes of example, and not of limitation, in the illustrated embodiment of timing diagram 500, a second target voltage of −1.5 volts is the potential at which sensor electrode 270-0 is to settle at before integration during the second portion 521 of sensing cycle 501. It is well-known that an RC time constant establishes a length of time that it takes for a capacitor to charge to an applied voltage. However, instead of simply applying the second target voltage and then waiting the appropriate number of time constants for sensor electrode 270-0 to charge to and then settle at that second target voltage, the illustrated embodiment applies a boosted voltage that is beyond the second target voltage. For example, during time period 523, $V_{RX}$ is boosted by sensor module 310-1 to a third voltage of −2.5 v (in this example), which is beyond the second target voltage of −1.5 v. This causes sensor electrode 270-0 to charge toward this second boosted voltage for the duration of time period 523. It should be appreciated that the length of time period 523 may be adjusted to be shorter or longer by sensor module 310-1. The charged voltage on sensor electrode 270-0 is very near (slightly above or below) the first target voltage at the end of time period 523. Time period 524 runs from the end of time period 523 and until the end of second portion 521. It should be appreciated that the length of time period 524 may be adjusted to be shorter or longer by sensor module 310-1. During time period 524, $V_{RX}$ is modulated to a fourth voltage that is at the second target voltage so that the charged voltage on sensor electrode 270-0 can settle at the second target voltage and integration of charge on sensor electrode 270-0 can take place. Time period 522 represents the length of time that it takes for sensor electrode 270-0 to settle in to the second target voltage. During all or a portion of time period 525, the charge on sensor electrode 270-0 is received by the receiver (e.g., at the non-inverting input of amplifier 410) and is integrated to produce voltage $V_{OUT}$ at the output of amplifier 410. This $V_{OUT}$ is used by determination module 320 to determine an absolute capacitance, $C_B$, of sensor electrode 270-0 during the second portion 521 of sensing cycle 501.

The difference between the first target voltage and the second target voltage is shown by arrows 530, and this difference is the actual voltage of modulation that occurs on the sensor electrode (e.g., sensor electrode 270-0) during sensing cycle 501 while performing absolute capacitive sensing with pre-emphasis. The $V_{OUT}$ voltages during the first portion 511 and second portion 521 of sensing cycle 501 are utilized by processing system 110A-1 to determine the absolute capacitance, $C_B$, of sensor electrode 270-0 during sensing cycle 501.

Sensor electrode 270-0 acts as a capacitor being charged by $V_{RX}$. A rule of thumb for RC time constants is that a capacitor can charge from whatever its potential is at the beginning of the time constant to ~63.2% more of the potential remaining between its existing potential and the applied voltage during each RC time constant. Thus, after a single time constant while charging at the boosted voltage of +2.5 volts, sensor electrode 270-0 would be able to charge to slightly beyond +1.5 v; however, if only the target voltage had been modulated on to sensor electrode 270-0 a single time constant of charging would only result in a charge of a little less than +1 v. In this manner, during the first portion 511 of sensing cycle 501 pre-emphasis at a first boosted voltage (+2.5 v in this example) that is beyond the first target voltage (+1.5 v in this example) causes sensor electrode 270-0 to settles at the first target voltage more quickly than without such pre-emphasis. Likewise, during the second portion 521 of sensing cycle 501 pre-emphasis at a second boosted voltage (−2.5 v in this example) that is beyond the second target voltage (−1.5 v in this example) causes sensor electrode 270-0 to settles at the second target voltage more quickly than without such pre-emphasis. These quicker settlings allow integration during each portion (511, 521) of sensing cycle 501 to be conducted sooner than it could be in the absence of pre-emphasis, and thus the overall time period of a sensing cycle 501 is shorter than a similar time period of the sensing cycle without the use of pre-emphasis.

FIG. 6 illustrates an example input device 600, according to an embodiment. Input device 600 includes a processing system 110A-2 that is electrically coupled, such has by routing trace(s), with one or more sensor electrodes (sensor electrode 270-0 depicted) of a sensor electrode pattern (e.g., sensor electrode pattern 200) that forms a sensing region 120. Processing system 110A-2 includes sensor module 310-2 and is one embodiment of processing system 110A that is depicted in FIG. 3. Sensor module 310-2 is one embodiment of sensor module 310 of FIG. 3. As depicted, sensor module 310-2 includes a receiver in the form of amplifier 410. In operation, a reference voltage potential (e.g., 0 v, ground, or some other fixed potential) is coupled with the non-inverting input of amplifier 410. Feedback capacitor, $C_{FB}$, is coupled between the output and the inverting input of amplifier 410. A switch, $SW_{FB}$, is coupled in parallel with $C_{FB}$. The inverting input of amplifier 410 is coupled with a sensor electrode, such as sensor electrode 270-0 when switch $SW_{INP}$ is closed by sensor module 310-2 to allow integration of charge on sensor electrode 270-0, and is decoupled from sensor electrode 270-0 when $SW_{INP}$ is opened by sensor module 310-2. $SW_{FB}$ is closed to reset $C_{FB}$ and is opened when amplifier 410 is used to integrate charge off of sensor electrode 270-0. Generally, $SW_{FB}$ and $SW_{INP}$ are in opposite states, with $SW_{FB}$ being opened when $SW_{INP}$ is closed and vice-a-versa.

A positive high voltage, $V_{PH}$, is coupled with sensor electrode 270-0 by closing switch $SW_{PHV}$ and is decoupled by opening $SW_{PHV}$. A positive medium voltage, $V_{PM}$, is coupled with sensor electrode 270-0 by closing switch $SW_{PMV}$ and is decoupled by opening $SW_{PMV}$. A negative high voltage, $V_{NH}$, is coupled with sensor electrode 270-0 by closing switch $SW_{NHV}$ and is decoupled by opening $SW_{NHV}$. A negative medium voltage, $V_{NM}$, is coupled with sensor electrode 270-0 by closing switch $SW_{NMV}$ and is decoupled by opening $SW_{NMV}$. $SW_{PHV}$ and $SW_{NHV}$ are utilized for pre-emphasis by coupling boosted voltages to sensor electrode 270-0 that are beyond target voltages of sensor electrode 270-0. $SW_{PMV}$ and $SW_{NMV}$ are utilized for coupling target positive and negative voltages to sensor electrode 270-0. Because $SW_{PHV}$, $SW_{PMV}$, $SW_{NHV}$, and $SW_{NMV}$ are located on the sensor electrode side of $SW_{INP}$, they can be used also be used to pre-charge sensor electrode 270-0 to positive and negative target voltages while $SW_{INP}$ is open and sensor electrode 270-0 is decoupled from the inverting input of amplifier 410.

FIG. 7 illustrates a timing diagram 700 for absolute capacitive sensing with the input device 600 of FIG. 6, according to an embodiment. Timing diagram 700 illustrates a modulated signal in the form of receiver voltage, $V_{RX}$, that is driven on a sensor electrode, such as sensor electrode 270-0, over time during an example absolute capacitive sensing cycle 701 that utilizes both pre-charging and pre-emphasis to speed settling time of sensor electrode 270-0 to target voltages in each of two portions (711 and 721) of sensing cycle 701.

For purposes of example, and not of limitation, in the illustrated embodiment of timing diagram 700, a first target voltage of +3 volts is the potential at which sensor electrode 270-0 is to settle at before integration during the first portion 711 of sensing cycle 701. It is well-known that an RC time constant establishes a length of time that it takes for a capacitor to charge to an applied voltage. However, instead of simply applying the target voltage and then waiting the appropriate number of time constants for sensor electrode 270-0 to charge to and then settle at that target voltage, the illustrated embodiment applies a boosted voltage that is beyond the target voltage. For example, during time period 713, $V_{RX}$ is boosted by sensor module 310-2 to a first voltage of +5 v (in this example), which is beyond the first target voltage of +3 v. To do this sensor module 310-2 closes $SW_{PHV}$ while $SW_{PMV}$, $SW_{NHV}$, $SW_{NMV}$, and $SW_{INP}$ are open. This causes sensor electrode 270-0 to be coupled with a $V_{PH}$ of +5 v. Sensor electrode 260-0 charges toward this boosted voltage, $V_{PH}$, for the duration of time period 713, and thus pre-emphasizes the first target voltage on the sensor electrode before $V_{PM}$ is coupled with the sensor electrode. It should be appreciated that the length of time period 713 may be adjusted to be shorter or longer by sensor module 310-2. The charged voltage on sensor electrode 270-0 is very near (slightly above or below) the first target voltage at the end of time period 713. Time period 714 follows time period 713, and during time period 714 a second voltage that is at the first target voltage is applied to sensor electrode 270-0 by sensor module 310-2. To do this sensor module 310-2 closes $SW_{PMV}$ while $SW_{PHV}$, $SW_{NHV}$, $SW_{NMV}$, and $SW_{INP}$ are open. This causes sensor electrode 270-0 finish charging to and settle at the first target voltage, which is the same as $V_{MV}$. It should be appreciated that the length of time period 714 may be adjusted to be shorter or longer by sensor module 310-2. Time period 712 encompasses time periods 713 and 714 and represents the overall time that it takes for sensor electrode 270-0 to settle at the first target voltage. Time period 715 follows time period 714. During time period 715, sensor module 310-2 closes $SW_{INP}$ while $SW_{PHV}$, $SW_{PMV}$, $SW_{NHV}$, $SW_{NMV}$, and $SW_{FB}$ are open. During all or a portion of time period 715, the charge on sensor electrode 270-0 is received by the receiver (e.g., at the non-inverting input of amplifier 410) and is integrated to produce voltage $V_{OUT}$ at the output of amplifier 410. As a result of this integration $V_{RX}$ goes to 0 v during time period 715. This $V_{OUT}$ is used by determination module 320 to determine an absolute capacitance, $C_B$, of sensor electrode 270-0 during the first portion 711 of sensing cycle 701.

For purposes of example, and not of limitation, in the illustrated embodiment of timing diagram 700, a second target voltage of −3 volts is the potential at which sensor electrode 270-0 is to settle at before integration during the second portion 721 of sensing cycle 701. It is well-known that an RC time constant establishes a length of time that it takes for a capacitor to charge to an applied voltage. However, instead of simply applying the target voltage and then waiting the appropriate number of time constants for sensor electrode 270-0 to charge to and then settle at that target voltage, the illustrated embodiment applies a boosted voltage that is beyond the target voltage. For example, during time period 723, $V_{RX}$ is boosted by sensor module 310-2 to a third voltage of −5 v (in this example), which is beyond the second target voltage of −3 v. To do this sensor module 310-2 closes $SW_{NHV}$ while $SW_{PHV}$, $SW_{PMV}$, $SW_{NMV}$, and $SW_{INP}$ are open. This causes sensor electrode 270-0 to charge toward this boosted voltage, $V_{NH}$, for the duration of time period 723, and thus pre-emphasizes the second target voltage on the sensor electrode before $V_{NM}$ is coupled with the sensor electrode. It should be appreciated that the length of time period 723 may be adjusted to be shorter or longer by sensor module 310-2. The charged voltage on sensor electrode 270-0 is very near (slightly above or below) the first target voltage at the end of time period 723. Time period 724 follows time period 723, and during time period 724 a fourth voltage that is at the second target voltage is applied to sensor electrode 270-0 by sensor module 310-2. To do this, sensor module 310-2 closes $SW_{NMV}$ while $SW_{PHV}$, $SW_{PMV}$, $SW_{NHV}$, and $SW_{INP}$ are open. This causes sensor electrode 270-0 finish charging to and settle at the second target voltage. It should be appreciated that the length of time period 724 may be adjusted to be shorter or longer by sensor module 310-2. Time period 722 encompasses time periods 723 and 724 and represents the overall time that it takes for sensor electrode 270-0 to settle at the second target voltage. Time period 725 follows time period 724. During time period 725, sensor module 310-2 closes $SW_{INP}$ while $SW_{PHV}$, $SW_{PMV}$, $SW_{NHV}$, $SW_{NMV}$, and $SW_{FB}$ are open. During all or a portion of time period 725, the charge on sensor electrode 270-0 is received by the receiver (e.g., at the non-inverting input of amplifier 410) and is integrated to produce voltage $V_{OUT}$ at the output of amplifier 410. As a result of this integration $V_{RX}$ goes to 0 v during time period 725. This $V_{OUT}$ is used by determination module 320 to determine an absolute capacitance, $C_B$, of sensor electrode 270-0 during the second portion 721 of sensing cycle 701.

The $V_{OUT}$ voltages during the first portion 711 and second portion 721 of sensing cycle 701 are utilized by processing system 110A-2 to determine the absolute capacitance, $C_B$, of sensor electrode 270-0 during sensing cycle 701.

Sensor electrode 270-0 acts as a capacitor being charged by $V_{RX}$. A rule of thumb for RC time constants is that a capacitor can charge from whatever its potential is at the beginning of the time constant to ~63.2% more of the potential remaining between its existing potential and the applied voltage during each RC time constant. Thus, after a single time constant while charging at the boosted voltage of +5 volts, sensor electrode 270-0 would be able to charge to slightly beyond +3 v; however, if only the target voltage had been modulated on to sensor electrode 270-0 a single time constant of charging would only result in a charge of a little less than +1.9 v. In this manner, during the first portion 711 of sensing cycle 701 pre-emphasis at a first boosted voltage (+5 v in this example) that is beyond the first target voltage (+3 v in this example) causes sensor electrode 270-0 to settles at the first target voltage more quickly than without such pre-emphasis. Likewise, during the second portion 721 of sensing cycle 701 pre-emphasis at a second boosted voltage (−5 v in this example) that is beyond the second target voltage (−3 v in this example) causes sensor electrode 270-0 to settles at the second target voltage more quickly than without such pre-emphasis. These quicker settlings allow integration during each portion (711, 721) of sensing cycle 701 to be conducted sooner than it could be in the absence of pre-emphasis, and thus the overall time period of a sensing cycle 701 is shorter than a similar time period of the sensing cycle without the use of pre-emphasis.

FIG. 8 illustrates an example input device 800, according to an embodiment. Input device 800 includes a processing system 110A-3 that is electrically coupled, such has by routing trace(s), with one or more sensor electrodes (sensor electrode 270-0 depicted) of a sensor electrode pattern (e.g., sensor electrode pattern 200) that forms a sensing region 120. Processing system 110A-3 includes sensor module 310-3 and is one embodiment of processing system 110A that is depicted in FIG. 3. Sensor module 310-3 is one embodiment of sensor module 310 of FIG. 3. The structure of sensor module 310-3 and processing system 110A-3 are the same as the structure of sensor module 310-2 and processing system 110A-2 that were depicted and described in conjunction with FIG. 6 except that a modulated voltage, $V_{MOD}$, is coupled with the non-inverting input of amplifier 410 instead of a fixed reference voltage potential. Operation of input device 800, with respect to pre-charging and pre-emphasis, is the same as has been previously described with respect to input device 600. By coupling $V_{MOD}$ to the non-inverting input of amplifier 410, and through the feedback mechanisms of amplifier 410, $V_{MOD}$ can be used to set and control a voltage on the inverting input of amplifier 410 while $SW_{INP}$ is open. When $SW_{INP}$ is closed and amplifier 410 is coupled with sensor electrode 270-0, the voltage at the inverting input of amplifier 410 acts as a charge offset to the charge on sensor electrode 270-0 and reduces the amount of charge that needs to be integrated off of sensor electrode 270-0. Among other things, such offsetting of charge can increase the dynamic range of amplifier 410, can prevent saturation of amplifier 410, and can speed the time of integration by offsetting some charge and thus eliminating the time that it would have taken to integrate the offset charge off of the sensor electrode.

FIG. 9 illustrates a timing diagram 900 for absolute capacitive sensing with the input device 800 of FIG. 8, according to an embodiment. Timing diagram 900 illustrates a modulated signal in the form of receiver voltage, $V_{RX}$, that is driven on a sensor electrode, such as sensor electrode 270-0, over time during an example absolute capacitive sensing cycle 901 that utilizes charge offset during integration and uses both pre-charging, pre-emphasis to speed settling time of sensor electrode 270-0 to target voltages in each of two portions (911 and 921) of sensing cycle 901.

For purposes of example, and not of limitation, in the illustrated embodiment of timing diagram 900, a first target voltage of +3 volts is the potential at which sensor electrode 270-0 is to settle at before integration during the first portion 911 of sensing cycle 901. It is well-known that an RC time constant establishes a length of time that it takes for a capacitor to charge to an applied voltage. However, instead of simply applying the target voltage and then waiting the appropriate number of time constants for sensor electrode 270-0 to charge to and then settle at that target voltage, the illustrated embodiment applies a boosted voltage that is beyond the target voltage. For example, during time period 913, $V_{RX}$ is boosted by sensor module 310-3 to a first voltage of +5 v (in this example), which is beyond the first target voltage of +3 v. To do this, sensor module 310-3 closes $SW_{PHV}$ while $SW_{PMV}$, $SW_{NHV}$, $SW_{NMV}$, and $SW_{INP}$ are open. This causes sensor electrode 270-0 to charge toward this boosted voltage, $V_{PH}$, for the duration of time period 913, and thus pre-emphasizes the first target voltage on the sensor electrode before $V_{PM}$ is coupled with the sensor electrode. It should be appreciated that the length of time period 913 may be adjusted to be shorter or longer by sensor module 310-3. The charged voltage on sensor electrode 270-0 is very near (slightly above or below) the first target voltage at the end of time period 913. Time period 914 follows time period 913, and during time period 914 a second voltage that is at the first target voltage is applied to sensor electrode 270-0 by sensor module 310-3. To do this, sensor module 310-3 closes $SW_{PMV}$ while $SW_{PHV}$, $SW_{NHV}$, $SW_{NMV}$, and $SW_{INP}$ are open. This causes sensor electrode 270-0 finish charging to and settle at the first target voltage. It should be appreciated that the length of time period 914 may be adjusted to be shorter or longer by sensor module 310-3. Time period 912 encompasses time periods 913 and 914 and represents the overall time that it takes for sensor electrode 270-0 to settle at the first target voltage. During time period 912, $SW_{FB}$ is closed to reset $C_{FB}$. Time period 915 follows time period 914. During time period 915, sensor module 310-3 closes $SW_{INP}$ while $SW_{PHV}$, $SW_{PMV}$, $SW_{NHV}$, $SW_{NMV}$, and $SW_{FB}$ are open, and $V_{MOD}$ applies a positive voltage signal (+1.5 v in this example) to the non-inverting input of amplifier 410 in order to cause an offset voltage of +1.5 v on the inverting input of amplifier 410. During all or a portion of time period 915, the charge on sensor electrode 270-0 is received by the receiver (e.g., at the non-inverting input of amplifier 410) and is integrated to produce voltage $V_{OUT}$ at the output of amplifier 410; additionally, the offset voltage on the non-inverting input of amplifier 410 is coupled with sensor electrode 270-0. As a result of this integration $V_{RX}$ goes to +1.25 v during time period 915 (this floor is set by the offset voltage and means that time does not need to be expended to integrated the charge to zero on sensor electrode 270-0). This $V_{OUT}$ is used by determination module 320 to determine an absolute capacitance, $C_B$, of sensor electrode 270-0 during the first portion 911 of sensing cycle 901.

For purposes of example, and not of limitation, in the illustrated embodiment of timing diagram 900, a second target voltage of −3 volts is the potential at which sensor electrode 270-0 is to settle at before integration during the second portion 921 of sensing cycle 901. It is well-known that an RC time constant establishes a length of time that it takes for a capacitor to charge to an applied voltage. However, instead of simply applying the target voltage and then waiting the appropriate number of time constants for sensor electrode 270-0 to charge to and then settle at that target voltage, the illustrated embodiment applies a boosted voltage that is beyond the target voltage. For example, during time period 923, $V_{RX}$ is boosted by sensor module 310-3 to a third voltage of −5 v (in this example), which is beyond the second target voltage of −3 v. To do this, sensor module 310-3 closes $SW_{NHV}$ while $SW_{PHV}$, $SW_{PMV}$, $SW_{NMV}$, and $SW_{INP}$ are open. This causes sensor electrode 270-0 to charge toward this boosted voltage, $V_{NH}$, for the duration of time period 923, and thus pre-emphasizes the second target voltage on the sensor electrode before $V_{NM}$ is coupled with the sensor electrode. It should be appreciated that the length of time period 923 may be adjusted to be shorter or longer by sensor module 310-3. The charged voltage on sensor electrode 270-0 is very near (slightly above or below) the first target voltage at the end of time period 923. Time period 924 follows time period 923, and during time period 924 a fourth voltage that is at the second target voltage is applied to sensor electrode 270-0 by sensor module 310-3. To do this, sensor module 310-3 closes $SW_{NMV}$ while $SW_{PHV}$, $SW_{PMV}$, $SW_{NHV}$, and $SW_{INP}$ are open. This causes sensor electrode 270-0 finish charging to and settle at the second target voltage. It should be appreciated that the length of time period 924 may be adjusted to be shorter or longer by sensor module 310-3. Time period 922 encompasses time periods 923 and 924 and represents the overall time that it takes for sensor electrode 270-0 to settle at the second target voltage. During time period 922, $SW_{FB}$ is closed to reset $C_{FB}$. Time period 925 follows time period 924. During time period 925, sensor module 310-3 closes $SW_{INP}$ while $SW_{PHV}$, $SW_{PMV}$, $SW_{NHV}$, $SW_{NMV}$, and $SW_{FB}$ are open, and $V_{MOD}$ applies a positive voltage signal (−1.5 v in this example) to the non-inverting input of amplifier 410 in order to cause an offset voltage of −1.5 v on the inverting input of amplifier 410. During all or a portion of time period 925, the charge on sensor electrode 270-0 is received by the receiver (e.g., at the non-inverting input of amplifier 410) and is integrated to produce voltage $V_{OUT}$ at the output of amplifier 410. As a result of this integration $V_{RX}$ goes to −1.25 v during time period 925 (this floor is set by the offset voltage and means that time does not need to be expended to integrated the charge to zero on sensor electrode 270-0). This $V_{OUT}$ is used by determination module 320 to determine an absolute capacitance, $C_B$, of sensor electrode 270-0 during the second portion 921 of sensing cycle 901.

The difference between the first target voltage and the second target voltage is shown by arrows 930, and this difference is the actual voltage of modulation that occurs on the sensor electrode (e.g., sensor electrode 270-0) during sensing cycle 901 while performing absolute capacitive sensing with pre-charge, pre-emphasis, and charge offset. The $V_{OUT}$ voltages during the first portion 911 and second portion 921 of sensing cycle 901 are utilized by processing system 110A-3 to determine the absolute capacitance, $C_B$, of sensor electrode 270-0 during sensing cycle 901.

Example Methods of Operation

Figure 10B:
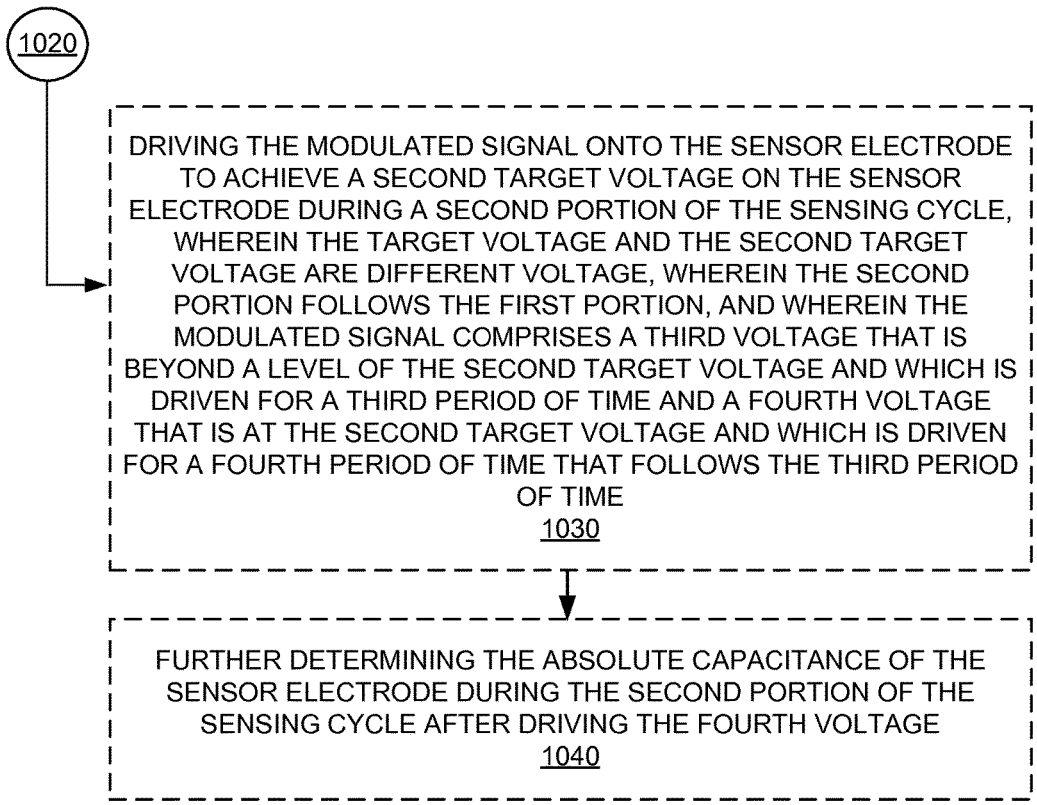
Figure 10C:
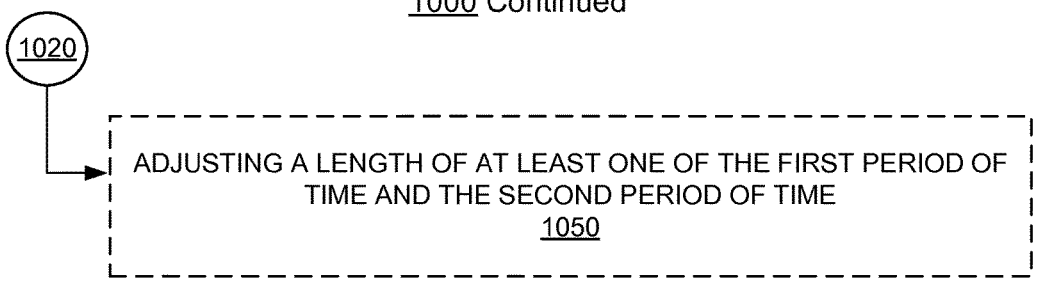

FIGS. 10A, 10B, and 10C illustrate a flow diagram 1000 of a method of capacitive sensing, according to various embodiments. Procedures of this method will be described with reference to elements and/or components of one or more of FIGS. 1-9. It is appreciated that in some embodiments, the procedures may be performed in a different order than described, that some of the described procedures may not be performed, and/or that one or more additional procedures to those described may be performed.

With reference to FIG. 10A, at procedure 1010 of flow diagram 1000, in one embodiment, a modulated signal is driven on to a sensor electrode to achieve a target voltage on the sensor electrode during a first portion of a sensing cycle. The modulated signal comprises a first voltage and a second voltage. The first voltage is beyond a level of the target voltage and is driven for a first period of time. The second voltage is at the target voltage and is driven for a second period of time that follows the first period of time.

As described in conjunction with FIG. 6 and FIG. 8, in some embodiments, the first voltage can be coupled with the sensor electrode through a first switch during a first time period. For example, with reference to FIGS. 6 and 8, closing switch $SW_{PHV}$ applies positive high voltage, $V_{PH}$, to sensor electrode 270-0. In such an embodiment, the second voltage can be coupled with the sensor electrode through a second switch during a second period of time. For example, with reference to FIGS. 6 and 8, closing switch $SW_{PMV}$ applies positive medium voltage, $V_{PM}$, to sensor electrode 270-0. In some embodiments, a reference input of a receiver can be driven to effect a charge offset while determining the absolute capacitance during the first portion of the sensing cycle. For example, as described in conjunction with FIG. 8 and FIG. 9, a positive potential of a modulated voltage, $V_{MOD}$, on the non-inverting input of amplifier 410 causes an equivalent positive offsetting voltage to be present on the inverting input of amplifier 410 during the integration of charge off of sensor electrode 270-0 in time period 915.

As described in conjunction with FIG. 4, in some embodiments, the first and second voltages can be coupled with the sensor electrode by selectively modulating a voltage, $V_{MOD}$, to a particular potential on a reference input of an amplifier (e.g., the non-inverting input of amplifier 410) and thus causing that voltage potential to be present on a second input of the amplifier (e.g., the inverting input amplifier 410). The second input then drives its voltage potential on to a sensor electrode that is coupled with the second input.

With continued reference to FIG. 10A, at procedure 1020 of flow diagram 1000, in one embodiment, an absolute capacitance of the sensor electrode is determined during the first portion of the sensing cycle after driving the second voltage. For example, determination module 320 of processing system 110A determines the absolute capacitance of the sensor electrode using techniques that are well-known in the art. If multiple sensor electrodes are similarly driven as described in procedure 1010, absolute capacitances can be determined from one or more of these multiple sensor electrodes.

With reference to FIG. 10B, as illustrated in procedure 1030 of flow diagram 1000, in some embodiments, the method as described in 1010-1020 further comprises driving the modulated signal on to the sensor electrode to achieve a second target voltage on the sensor electrode during a second portion of the sensing cycle. The target voltage and the second target voltage are different voltages. The second portion follows the first portion, and the modulated signal comprises a third voltage and a forth voltage. The third voltage is beyond a level of the second target voltage and is driven for a third period of time. The fourth voltage is at the second target voltage and is driven for a fourth period of time that follows the third period of time.

As described in conjunction with FIG. 6 and FIG. 8, in some embodiments, the third voltage can be coupled with the sensor electrode through a third switch during a third time period. For example, with reference to FIGS. 6 and 8, closing switch $SW_{NHV}$ applies negative high voltage, $V_{NH}$, to sensor electrode 270-0. In such an embodiment, the fourth voltage can be coupled with the sensor electrode through a fourth switch during a fourth period of time. For example, with reference to FIGS. 6 and 8, closing switch $SW_{NMV}$ applies negative medium voltage, $V_{NM}$, to sensor electrode 270-0. In some embodiments, a reference input of a receiver can be driven to effect a charge offset while determining the absolute capacitance during the first portion of the sensing cycle. For example, as described in conjunction with FIG. 8 and FIG. 9, a negative potential of a modulated voltage, $V_{MOD}$, on the non-inverting input of amplifier 410 causes an equivalent negative offsetting voltage to be present on the inverting input of amplifier 410 during the integration of charge off of sensor electrode 270-0 in time period 925.

As described in conjunction with FIG. 4, in some embodiments, the third and fourth voltages can be coupled with the sensor electrode by selectively modulating a voltage, $V_{MOD}$, to a particular potential on a reference input of an amplifier (e.g., the non-inverting input of amplifier 410) and thus causing that voltage potential to be present on a second input of the amplifier (e.g., the inverting input amplifier 410). The second input then drives its voltage potential on to the sensor electrode that is coupled with the second input.

With continued reference to FIG. 10B, at procedure 1040 of flow diagram 1000, the method as described in procedures 1010-1030 further comprises, determining an absolute capacitance of the sensor electrode during the second portion of the sensing cycle after driving the fourth voltage. For example, determination module 320 of processing system 110A determines the absolute capacitance of the sensor electrode using techniques that are well-known in the art. If multiple sensor electrodes are similarly driven as described in procedure 1030, absolute capacitances can be determined from one or more of these multiple sensor electrodes.

It should be appreciated that in some embodiments, the method as described in 1010-1040 may further comprise adjusting a length of at least one of the third period of time and the fourth period of time. For example, an embodiment of sensor module 310 or some other portion of processing system 110 can shorten or lengthen a period of time that the third voltage is driven on to the sensor electrode and/or can shorten or lengthen the period of time that the fourth voltage is driven on to the sensor electrode. Such variations in these time periods allow for adjustments based on operating characteristics and also allow processing system 110 to be utilized with different sensor electrodes that have varying RC time constants and thus may charge at different rates.

With reference to FIG. 10C, as illustrated in procedure 1050 of flow diagram 1000, in some embodiments, the method as described in 1010-1020 further comprises adjusting a length of at least one of the first period of time and the second period of time. For example, an embodiment of sensor module 310 or some other portion of processing system 110 can shorten or lengthen a period of time that the first voltage is driven on to the sensor electrode and/or can shorten or lengthen the period of time that the second voltage is driven on to the sensor electrode. Such variations in these time periods allow for adjustments based on operating characteristics and also allow processing system 110 to be utilized with different sensor electrodes that have varying RC time constants and thus may charge at different rates.

The examples set forth herein were presented in order to best explain, to describe particular applications, and to thereby enable those skilled in the art to make and use embodiments of the described examples. However, those skilled in the art will recognize that the foregoing description and examples have been presented for the purposes of illustration and example only. The description as set forth is not intended to be exhaustive or to limit the embodiments to the precise form disclosed.

What is claimed is:

1. A processing system comprising:
a sensor module configured to:
drive a modulated signal on to a sensor electrode to achieve a target voltage on said sensor electrode during a first portion of a sensing cycle, wherein said modulated signal comprises:
a first voltage that is beyond a level of said target voltage and which is driven for a first period of time, and
a second voltage that is at said target voltage and which is driven for a second period of time that follows said first period of time,
decouple said sensor electrode from an amplifier using a first switch,
couple, while said sensor electrode is decoupled from said amplifier, said first voltage with said sensor electrode through a second switch during said first period of time,
couple, while said sensor electrode is decoupled from said amplifier, said second voltage with said sensor electrode through a third switch during said second period of time,
couple said sensor electrode with said amplifier using said first switch while said first voltage is decoupled from said sensor electrode using said second switch and while said second voltage is decoupled from said sensor electrode using said third switch; and
a determination module configured to determine an absolute capacitance of said sensor electrode during said first portion of said sensing cycle only after said second voltage is coupled with said sensor electrode, said second voltage is driven, and said sensor electrode is caused, by said second voltage, to settle at said target voltage.

2. The processing system of claim 1, wherein said sensor module is further configured to drive said modulated signal on to said sensor electrode to achieve a second target voltage on said sensor electrode during a second portion of said sensing cycle, wherein said target voltage and said second target voltage are different voltages, wherein said second portion follows said first portion, and wherein said modulated signal comprises a third voltage that is beyond a level of said second target voltage and which is driven for a third period of time and a fourth voltage that is at said second target voltage and which is driven for a fourth period of time that follows said third period of time; and
wherein said determination module is further configured to further determine said absolute capacitance of said sensor electrode during said second portion of said sensing cycle only after said fourth voltage is driven and said sensor electrode is caused, by said fourth voltage, to settle at said second target voltage.

3. The processing system of claim 2, wherein said sensor module is configured to:
couple said third voltage with said sensor electrode through a fourth switch during said third period of time; and
couple said fourth voltage with said sensor electrode through a fifth switch during said fourth period of time, wherein said determination module is configured to determine said absolute capacitance during second portion of said sensing cycle only after said fourth voltage has been coupled with said sensor electrode and said fourth voltage has caused said sensor electrode to settle at said second target voltage.

4. The processing system of claim 2, wherein said sensor module is configured to adjust a length of at least one of said third period of time and fourth period of time.

5. The processing system of claim 1, wherein said sensor module is configured to drive said modulated signal by driving a reference input of a receiver coupled with said sensor electrode.

6. The processing system of claim 1, wherein said sensor module is configured to adjust a length of at least one of said first period of time and second period of time.

7. The processing system of claim 1, wherein said sensor module comprises a receiver coupled with said sensor electrode, the receiver having a reference input, where said sensor module is configured to:
drive said reference input to effect a charge offset while receiving resulting signals with the receiver.

8. A capacitive sensing input device, said capacitive sensing input device comprising:
a plurality of sensor electrodes; and
a processing system configured to operate said sensor electrodes to perform absolute capacitive sensing, wherein said processing system configured to:
drive a modulated signal on to a sensor electrode of said plurality of sensor electrodes to achieve a target voltage on said sensor electrode during a first portion of a sensing cycle, wherein said modulated signal comprises:
a first voltage that is beyond a level of said target voltage and which is driven for a first period of time, and
a second voltage that is at said target voltage and which is driven for a second period of time that follows said first period of time;
decouple said sensor electrode from an amplifier using a first switch,
couple, while said, sensor electrode is decoupled from said amplifier, said first voltage with said sensor electrode through a second switch during said first period of time,
couple, while said sensor electrode is decoupled from said amplifier, said second voltage with said sensor electrode through a third switch during said second period of time,
couple said sensor electrode with said amplifier using said first switch while said first voltage is decoupled from said sensor electrode using said second switch and while said second voltage is decoupled from said sensor electrode using said third switch,
determine an absolute capacitance of said sensor electrode during said first portion of said sensing cycle only after said second voltage is coupled with said sensor electrode, driving said second voltage and causing, by said second voltage, said sensor electrode to settle at said target voltage;
drive said modulated signal on to said sensor electrode to achieve a second target voltage on said sensor electrode during a second portion of said sensing cycle, wherein said target voltage and said second target voltage are different voltages, wherein said second portion follows said first portion, and wherein said modulated signal comprises a third voltage and a fourth voltage, said third voltage beyond a level of said second target voltage and driven for a third period of time, said fourth voltage at said second target voltage and driven for a fourth period of time that follows said third period of time; and further determine said absolute capacitance during said second portion of said sensing cycle only after driving said fourth voltage and causing, by said fourth voltage, said sensor electrode to settle at said second target voltage.

9. The capacitive sensing input device of claim 8, wherein said processing system is further configured to:
drive said modulated signal by driving a reference input of a receiver coupled with said sensor electrode.

10. The capacitive sensing input device of claim 8, wherein said processing system is further configured to:
couple said third voltage with said sensor electrode through a fourth switch during said third period of time; and couple said fourth voltage with said sensor electrode through a fifth switch during said fourth period of time, wherein said processing system is configured to determine said absolute capacitance of said sensor electrode during said second portion of said sensing cycle only after said fourth voltage has been coupled with said sensor electrode and said fourth voltage has caused said sensor electrode to settle at said second target voltage.

11. The capacitive sensing input device of claim 10, wherein said processing system is further configured to:
drive a reference input of a receiver to effect a first charge offset while determining said absolute capacitance during said first portion of said sensing cycle, said receiver coupled with said sensor electrode; and drive said reference input of said receiver to effect a second charge offset while determining said absolute capacitance during said second portion of said sensing cycle.

12. A method of capacitive sensing, said method comprising:
driving a modulated signal on to a sensor electrode to achieve a target voltage on said sensor electrode during a first portion of a sensing cycle, wherein said modulated signal comprises:
  a first voltage that is beyond a level of said target voltage and which is driven for a first period of time, and
  a second voltage that is at said target voltage and which is driven for a second period of time that follows said first period of time;
decouple said sensor electrode from an amplifier using a first switch,
couple, while said sensor electrode is decoupled from said amplifier, said first voltage with said sensor electrode through a second switch during said first period of time,
couple, while said sensor electrode is decoupled from said amplifier, said second voltage with said sensor electrode through a third switch during said second period of time, couple said sensor electrode with said amplifier using said first switch while said first voltage is decoupled from said sensor electrode using said second switch and while said second voltage is decoupled from said sensor electrode using said third switch; and determining an absolute capacitance of said sensor electrode during said first portion of said sensing cycle only after coupling said second voltage with said sensor electrode, driving said second voltage and causing, by said second voltage, said sensor electrode to settle at said target voltage.

13. The method as recited in claim 12, further comprising:
driving said modulated signal on to said sensor electrode to achieve a second target voltage on said sensor electrode during a second portion of said sensing cycle, wherein said target voltage and said second target voltage are different voltages, wherein said second portion follows said first portion, and wherein said modulated signal comprises a third voltage that is beyond a level of said second target voltage and which is driven for a third period of time and a fourth voltage that is at said second target voltage and which is driven for a fourth period of time that follows said third period of time; and further determining said absolute capacitance of said sensor electrode during said second portion of said sensing cycle only after driving said fourth voltage and causing, by said fourth voltage, said sensor electrode to settle at said second target voltage.

14. The method as recited in claim 13, wherein said driving said modulated signal on to said sensor electrode to achieve a second target voltage on said sensor electrode during a second portion of said sensing cycle comprises:
coupling said third voltage with said sensor electrode through a fourth switch during said third period of time; and coupling said fourth voltage with said sensor electrode through a fifth switch during said fourth period of time.

15. The method as recited in claim 13, further comprising:
adjusting a length of at least one of said third period of time and said fourth period of time.

16. The method as recited in claim 12, further comprising:
adjusting a length of at least one of said first period of time and said second period of time.

17. The method as recited in claim 12, further comprising:
driving a reference input of a receiver to effect a charge offset while determining said absolute capacitance during said first portion of said sensing cycle, said receiver coupled with said sensor electrode.

18. The method as recited in claim 12, wherein said driving said modulated signal comprises:
driving a reference input of a receiver coupled with said sensor electrode.

* * * * *